United States Patent
Chauvel

(10) Patent No.: US 9,897,012 B2
(45) Date of Patent: Feb. 20, 2018

(54) METHOD FOR IMPROVED ASSEMBLY OF AN ACTUATOR FOR AN AIR BLEED VALVE OF A TURBINE ENGINE

(71) Applicant: SNECMA, Paris (FR)

(72) Inventor: Sylvain Chauvel, Savigny sur Orge (FR)

(73) Assignee: SNECMA, Paris (FR)

( * ) Notice: Subject to any disclaimer, the term of this patent is extended or adjusted under 35 U.S.C. 154(b) by 345 days.

(21) Appl. No.: 14/399,049

(22) PCT Filed: May 6, 2013

(86) PCT No.: PCT/FR2013/051006
§ 371 (c)(1),
(2) Date: Nov. 5, 2014

(87) PCT Pub. No.: WO2013/167836
PCT Pub. Date: Nov. 14, 2013

(65) Prior Publication Data
US 2015/0101481 A1  Apr. 16, 2015

(30) Foreign Application Priority Data

May 7, 2012  (FR) .................................... 12 54175

(51) Int. Cl.
*F02C 9/18*  (2006.01)
*F02C 6/08*  (2006.01)
(Continued)

(52) U.S. Cl.
CPC .................. *F02C 9/18* (2013.01); *F02C 6/08* (2013.01); *F04D 27/023* (2013.01);
(Continued)

(58) Field of Classification Search
CPC .. F04D 27/009; F04D 27/0207; F04D 27/023; F04D 27/0215; F04D 27/0223;
(Continued)

(56) References Cited

U.S. PATENT DOCUMENTS 3,154,241 A * 10/1964 Kent .................... F04D 27/0215
137/625.28
4,344,282 A *  8/1982 Anders ................. F01D 17/105
137/625.28
(Continued)

FOREIGN PATENT DOCUMENTS

EP     2 034 134 A1   3/2009
WO  WO 2007/116319 A2  10/2007
WO  WO 2007/116319 A3  10/2007

OTHER PUBLICATIONS

International Search Report dated Oct. 10, 2013, in PCT/FR13/051006 filed May 6, 2013.
(Continued)

*Primary Examiner* — Logan Kraft
*Assistant Examiner* — Michael Quandt
(74) *Attorney, Agent, or Firm* — Oblon, McClelland, Maier & Neustadt, L.L.P.

(57) ABSTRACT

A method for assembling an actuating ram of air bleed valves, which ram is placed between low pressure and high pressure compressors of a turbomachine, the ram including a piston rod surrounded by a spacer extending from the piston cylinder and configured to be connected to an end of the transmission mechanism linked to the bleed valves, the method including: deploying the piston rod such that it projects from the spacer; connecting the projecting piston rod to the end of the transmission mechanism; retracting the piston rod to bring the cylinder closer to the case wall; and attaching the spacer to the case wall.

7 Claims, 6 Drawing Sheets

(51) Int. Cl.
*F15B 15/14* (2006.01)
*F04D 27/02* (2006.01)
*F04D 29/64* (2006.01)
*F01D 17/10* (2006.01)
*F04D 27/00* (2006.01)

(52) U.S. Cl.
CPC ....... *F04D 27/0215* (2013.01); *F04D 29/644* (2013.01); *F15B 15/14* (2013.01); *F01D 17/105* (2013.01); *F04D 27/009* (2013.01); *F05D 2230/60* (2013.01); *Y02T 50/671* (2013.01); *Y10T 29/49229* (2015.01)

(58) Field of Classification Search
CPC .............. F04D 29/682; F05D 2260/606; F05D 2270/64; F02C 6/08; F02C 9/18; F01D 7/105
USPC .............................................. 92/161; 415/145
See application file for complete search history.

(56) References Cited

U.S. PATENT DOCUMENTS

| | | | |
|---|---|---|---|
| 4,765,131 A | | 8/1988 | Benson |
| 4,785,624 A | * | 11/1988 | Smith ................ F01D 17/105 137/625.31 |
| 7,594,403 B2 | * | 9/2009 | Cadieux ............. F01D 17/105 60/782 |
| 2008/0028764 A1 | | 2/2008 | Cadieux |
| 2008/0131266 A1 | | 6/2008 | Vrljes et al. |
| 2009/0056307 A1 | | 3/2009 | Mons |

OTHER PUBLICATIONS

French Preliminary Search Report dated Aug. 21, 2012, in French Application No. 12 54175 filed May 7, 2012.

* cited by examiner

METHOD FOR IMPROVED ASSEMBLY OF AN ACTUATOR FOR AN AIR BLEED VALVE OF A TURBINE ENGINE

TECHNICAL FIELD

The present invention relates to the field of actuating rams of air bleed valves placed between a low pressure compressor and a high pressure compressor of a turbomachine, preferably an aircraft turbomachine.

These bleed valves, also designated by the acronym VBV (Variable Bleed Valves) are indeed intended to be actuated under some circumstances in order to enable part of the air from the stream to switch from the primary flux to the secondary flux, in particular to avoid pumping phenomenon. In other words, these valves are intended to control the flow rate at the inlet of the high pressure compressor in order to limit in particular the pumping risks of the low pressure compressor by enabling part of the air to be discharged out of the annular flow space of the primary flux. Furthermore, in case of an accidental penetration of water into this flow space, in particular as rain or hail, or even of various debris, which are likely to be detrimental to the turbojet engine operation, these valves allow the recovering of this water or these debris which are centrifuged into the aforesaid flow space and their ejection outwardly from the same. In the case of turbofans, these valves can also be configured to enable fragments or debris to go from the flow space of the primary flux to an annular flow space of a secondary flux.

The invention more precisely relates to the method of assembling an actuating ram of such bleed valves, to a case wall, in particular when the access conditions offered to the operator are restricted.

STATE OF PRIOR ART

As illustrated in FIG. 1 which is an axial cross-section schematic view of a twin-spool turbojet engine 10, such a turbojet engine generally includes, from upstream to downstream along the gas flow direction, a low pressure compressor 12, a high pressure compressor 14, a combustion chamber 16, a high pressure turbine 18 and a low pressure turbine 20, which define a gas primary flux 22. The high pressure turbine 18 is integral to the high pressure compressor 14 so as to form a high pressure spool, whereas the low pressure turbine 20 is integral to the low pressure compressor 12 so as to form a low pressure spool, such that each turbine drives the rotatably associated compressor about a turbojet engine axis 24 under the thrust of the gases from the combustion chamber 16.

An intermediate case 26 is usually sandwiched between the low pressure 12 and high pressure 14 compressors.

In the case of turbo fans, which comprise a fan 28 ducted by a nacelle 30 to generate a secondary flux 32, the intermediate case 26 generally includes arms 34 passing through the flow space of this secondary flux 32. These arms, generally four of them and distributed at 90°, define between each other spaces wherein are arranged outlet guide vanes (OGV) (not shown).

FIG. 2 illustrates at a greater scale the hub 36 of the intermediate case 26 of a turbojet engine of a known type analogous to that described above.

This hub 36 includes an inner shroud 38 bounding the flow space of the primary flux 22, an upstream flange 40 and a downstream flange 42 which are connected to the aforesaid inner shroud 38, as well as an outer shroud 44 linking said flanges 40, 42.

The hub 36 supports intermediate case arms 34 attached to the radially outer ends of the flanges 40 and 42. It also carries outlet guide vanes.

Besides, this hub 36 is equipped with an annular row of bleed valves 48, one of which is visible in cross-section in FIG. 2. In this figure, there appears more specifically the gate 50 of the valve 48, which is pivotably mounted about an axis 51, so as to be movable between an opening position and a closing position of a corresponding port formed in the inner shroud 38 of the hub 36.

For actuating the bleed valves 48, actuated rams 62 are provided, usually two of them arranged at 180°, as well as a transmission mechanism 100 sandwiched between these rams and the bleed valves. These transmission mechanisms are usually of the actuating ring, or twist cable type.

In this embodiment, both rams are mounted to the downstream flange 42, but could alternatively be mounted on any case wall, preferably located in proximity to the bleed valves they actuate.

FIG. 3 shows an exemplary assembly of the actuating ram 62 to a case wall 60, which thus corresponds herein to the aforesaid downstream flange. In this example, the ram 62 is attached to the case wall 60 using a spacer 64 extending from the ram cylinder 66. The spacer therefore has a diameter substantially identical to that of the cylinder, and extends from the cylinder end from which projects the piston rod 68. Besides, the spacer 64 surrounds the external end of the piston rod 68, that is that opposite to the end carrying the piston.

The spacer 64 has a downstream end integral to the cylinder, for example fastened by screwing. It then extends upstream to end with a collar 70 for bearing on the downstream surface of the wall 60. It is this collar 70 which is mounted by screwing to the case wall 60, for example using screws and inserts.

The design of this exemplary embodiment of prior art has essentially been dictated by access difficulties for the operator which, here, can only intervene on the downstream side of the wall 60, that is on the side of the so-called "core zone" located downstream of the fan zone, from which it is separated by the intermediate case.

Thus, the transmission mechanism is provided to include an end 74 arranged projecting from the wall 60, to downstream. This end 74 is for example integral to an outlet connecting rod 76 passing through an opening of the wall 60, this connecting rod 76 being usually provided to be actuated by the ram for the purpose of bringing the bleed valves from the opening position to the closing position, and reversely.

The end 74 is connected to the free end of the piston rod 68, as can be seen in FIG. 3. The mechanical junction 78 between the piston rod 68 and the end 74, for example of the ball-jointed connection type, thus lies inside the spacer 64, provided with one or more side openings 80 enabling the operator's fingers to go through to access the junction 78.

For assembling the ram 62, the spacer 64 is first attached to the downstream surface of the wall, with the piston rod in a retracted position. The operator, who here only has access from the core zone, then passes his/her fingers through the side openings 80 lying facing the end 74 and the piston rod end, in order to link them to form the mechanical junction 78. For disassembling the ram carried out in particular during maintenance phases, the abovementioned operations are implemented in the reverse order.

The openings should thus have a sufficient length to enable the operator's fingers to go through. This results in providing a large length for the spacer, which is necessarily accompanied by a high weight. This problem is all the more restricting that in order to provide the fire prevention function described below, the spacer generally is made of steel, and can make up more than half the overall weight of the ram. The extra length of the actuating ram due to the attachment spacer besides creates installing constraints as well as vibration amplifications. The cost is also impacted, since the spacer must undergo machinings for forming these openings.

Furthermore, it is noted that the side openings of the spacer are closed upon operating the turbomachine, for example by suitable removable metal sheets. This can be explained by the need to have available a spacer having a fire prevention function throughout its length. In particular, this fire prevention barrier is provided to avoid that a fire breaking out in the core zone spreads in the fan zone by passing inside the spacer.

Of course, the fire prevention function complicates the design of these metal sheets, because it requires expensive technologies due in particular to the low manufacturing tolerances permitted and to maintenance constraints, in particular the possibility of assembling and disassembling the ram in a limited period of time, for example in the order of fifteen minutes.

DISCLOSURE OF THE INVENTION

The object of the invention is to overcome at least partly the abovementioned drawbacks, relative to implementations of prior art.

To do this, the object of the invention is to provide a method for assembling an actuating ram of at least one air bleed valve placed between a low pressure compressor and a high pressure compressor of a turbomachine, said ram comprising on the one hand a cylinder intended to be attached to a case wall from which projects an end of a transmission mechanism linked to said air bleed valve, said cylinder being extended by a spacer being used to attach it to said case wall, and including on the other hand a piston rod surrounded by said spacer and intended to be connected to said end of the transmission mechanism, the method comprising the following successive steps of:

deploying the piston rod such that it projects from the spacer;
connecting the projecting piston rod to the end of the transmission mechanism;
retracting the piston rod so as to bring the cylinder closer to said case wall; and
attaching the spacer to the case wall.

The invention provides a simple, low cost and low weight solution, in particular thanks to the possibility of removing the spacer side openings made in prior art.

Indeed, since the side openings are no longer required, even when the operator has a restricted access available, the overall length of the spacer can be reduced. As a result, there is a weight and cost gain, the latter is also decreased thanks to the absence of metal sheets for sealing the openings, which besides makes it easier to achieve the fire prevention function at the spacer for attaching the actuating ram.

Preferably, the step of retracting the piston rod is implemented such that the mechanical junction between the piston rod and the end of the transmission mechanism lies, at the end of this step, inside said spacer.

However, in particular depending on the means used to retract the rod, it is possible that the mechanical junction is no longer inside the spacer at the end of this step. By way of example, this step is made either by using a pump to actuate the ram and cause the retraction of its rod, or the ram cylinder is pushed, for example manually, which could possibly result in changing the kinematics and moving the mechanism junction out of the spacer. In this regard, it is indicated that the fact of having the mechanical junction in the spacer at the end of this specific step is not essential, because upon starting the engine, the position of the ram rod is controlled by the calculator thanks to position sensors, and automatically brings this mechanical junction back to the position desired by the calculator, for example inside the spacer.

Preferably, the step of attaching the spacer through the case wall is carried out by screwing, for example using inserts equipping the case wall, and screws inserted and screwed from the side where the actuating ram lies, that is in the "core zone".

Preferably, the step of deploying the piston rod is carried out such that in a ram position enabling its piston rod to be connected to the end of the transmission mechanism, the case wall and the spacer define between each other an access enabling an operator's fingers to go through.

Preferably, the space is made so as to have no side opening. It is fixedly secured to the ram cylinder, or alternatively made as a single piece with this cylinder.

Preferably, the step of connecting the projecting piston rod to the end of the transmission mechanism is performed using a ball-jointed connection or a hinged connection. It is for example provided to place an axis between both these elements to be connected to achieve the ball-jointed/hinged connection. The process specific to the present invention thus turns out to be particularly adapted to provide the assembly of this connection type, requiring the intervention of the operator as close as possible to the two elements to be connected.

Such a connection enables in particular a non-linear movement of the end of the transmission mechanism to be allowed. This is in particular the case when the mechanism connecting rod carrying this end is intended to describe a complex trajectory, with for example at least one arc of circle component.

Preferably, the method comprises a prior step of dimensioning the ram, respecting the following condition:

$(C-M)/2=Y$; with

"C" corresponding to the theoretical maximum stroke of the piston;
"M" corresponding to the mechanical stop margin in a retracted position of the rod;
"Y" corresponding to the distance between the wall and the centre of the mechanical junction between the piston rod (68) and the end, with the centre of the mechanical junction arranged in the spacer attached to the wall, and bringing on the one hand each valve into a closing position and bringing on the other hand the piston rod into a retracted position.

This dimensioning is particularly optimal to enable a satisfactory access for the operator, while having a reduced overall space. However, other values are possible for Y, the aim being in particular to bring the mechanical junction sufficiently far from the wall to enable an easy manipulation for the operator ensuring the connection.

Preferably, the distance "C–M" is equal to about 40 mm. This distance "C–M" also corresponds preferably to the access enabling an operator's fingers to go through, when the piston rod is placed in the deploying position.

Another object of the invention is also to provide an actuating ram of at least one air bleed valve for being placed between a low pressure compressor and a high pressure compressor of a turbomachine, said ram comprising on the one hand a cylinder extended by a spacer being used to attach the ram to a case wall of a turbomachine, and including on the other hand a piston rod surrounded by said spacer and intended to be connected to the end of the transmission mechanism. According to the invention, said spacer is free of side openings. In other words, it is made in a single piece, by being solid and continuous on 360°. This enables it in particular to ensure a very satisfactory fire prevention function.

Further advantages and characteristics of the invention will appear in the detailed non-limiting description below.

BRIEF DESCRIPTION OF THE DRAWINGS

The invention will be better understood, and further details, advantages and characteristics thereof will appear upon reading the following description made by way of non-limiting example and in reference to the appended drawings wherein.

DETAILED DESCRIPTION OF PREFERRED EMBODIMENTS

Figure 1:
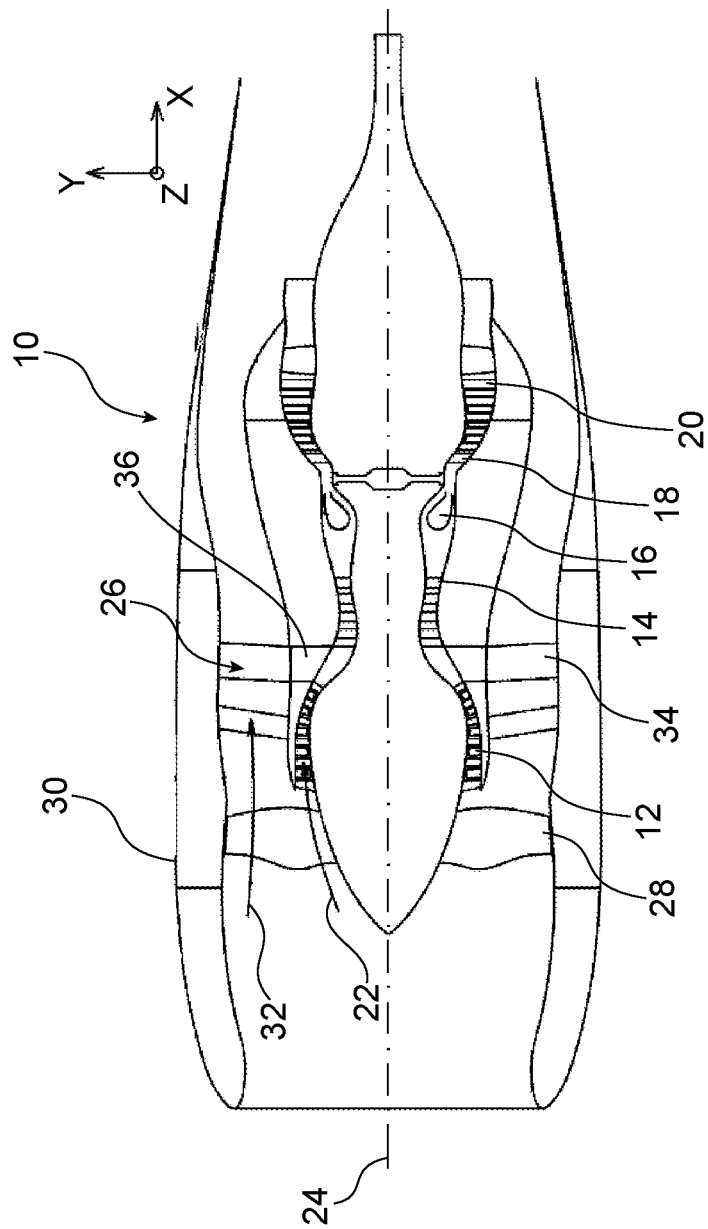
FIG. 1, already described, is an axial cross-section schematic view of an airplane twin-spool turbojet engine of a known type.
Figure 2:
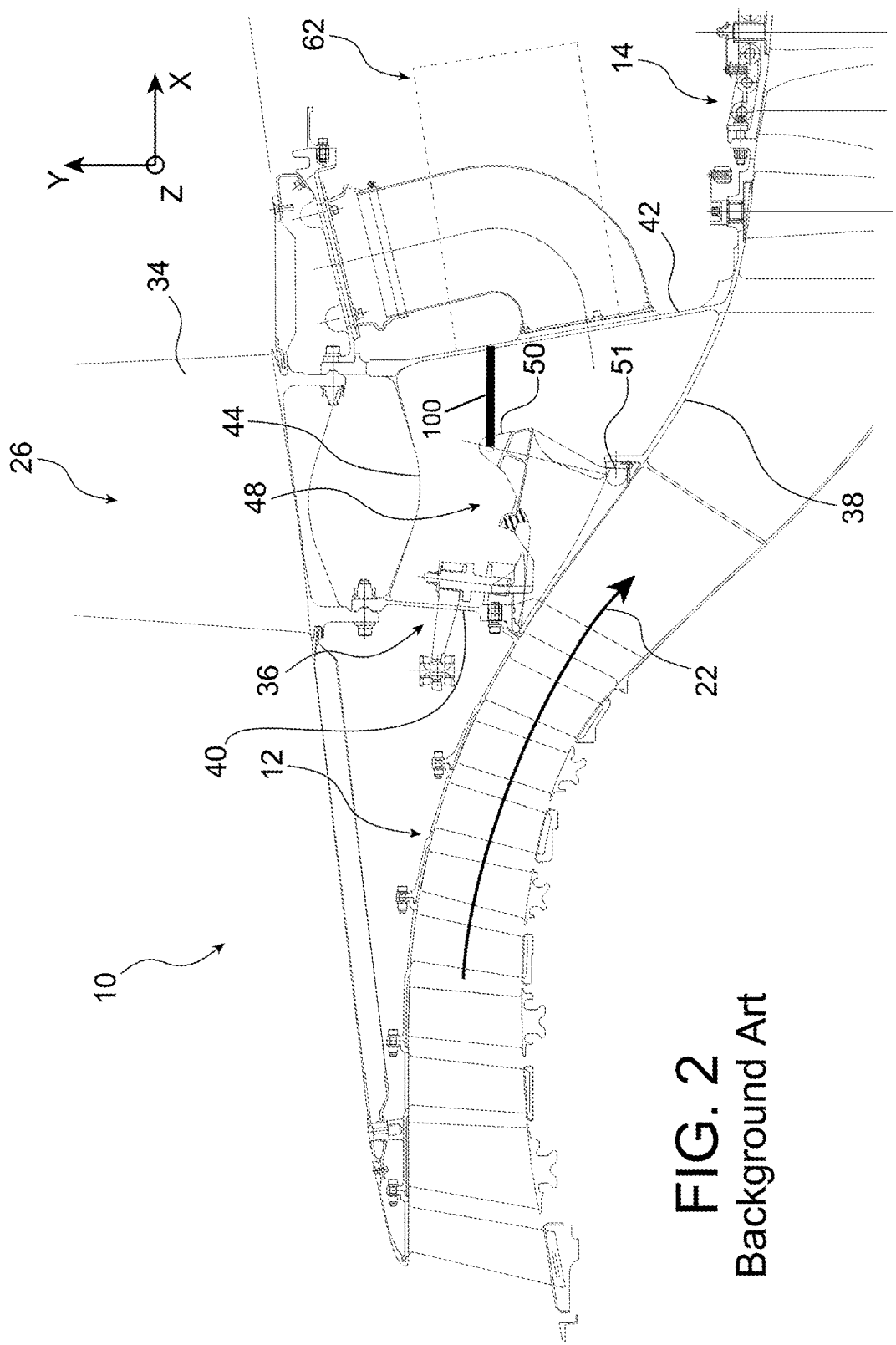
FIG. 2, already described, is an axial cross-section partial schematic view at a greater scale of a turbojet engine of a known type substantially of the same type as that of FIG. 1.
Figure 3:
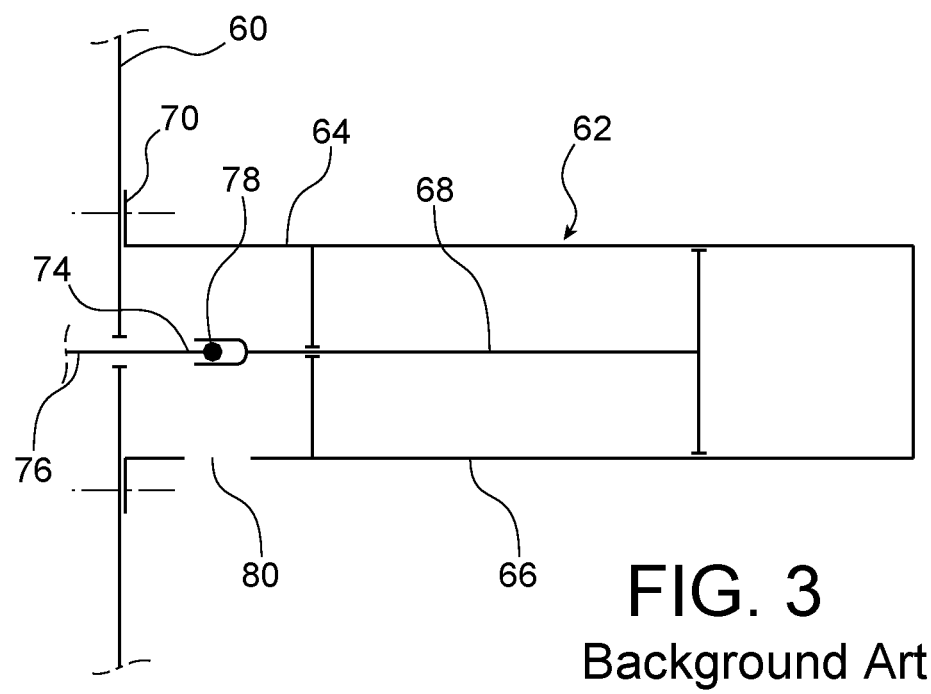
FIG. 3, already described, is a cross-section schematic view for assembling an actuating ram of bleed valves, to a case wall.

A preferred embodiment of the assembling method according to the invention is represented in FIGS. 4a to 4d. It aims at assembling, to the case wall 60, the ram 62 actuating the VBV bleed valves 48, through the transmission mechanism. For the implantation of the invention, the elements described in reference to FIGS. 1 to 3 remain identical or similar, except for the spacer 64 which is free of side openings. It thus has a fully solid side wall extending between its upstream collar 70 and its downstream end integral to the ram cylinder 66. Thus, in the figures, the elements bearing identical reference numerals correspond to identical or similar elements.

Here again, the spacer 64 can be fixedly fastened to the ram cylinder 66, or be made as a single piece with the same. In the first case, steel will be preferentially chosen, whereas in the second case, it would rather be aluminium or an alloy thereof.

Figure 4A:
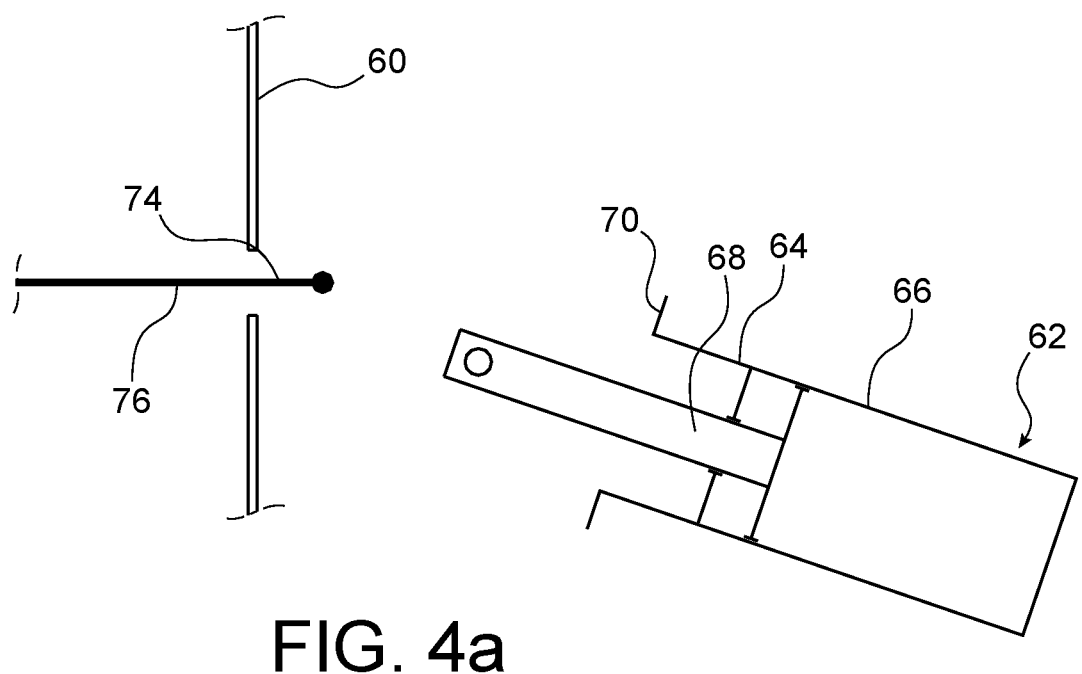
FIGS. 4a to 4d represent different successive steps for mounting an actuating ram of bleed valves, according to a preferred embodiment of the invention.

For the implementation of the method, first the end 74 of the connecting rod 76 should be projecting with respect to the wall 60, to downstream, that is on the side where the ram should be assembled. The projection distance has to be such as to then allow handling by the operator, as will be described hereinafter. This position of the connecting rod 76 can correspond to any position of its stroke along its axis, at the end of which it places the VBV valves respectively in the opening position and in the closing position. However, preferentially, this position of FIG. 4a is close or identical to that placing VBV valves into the closing position.

In parallel, the deployment of the piston rod 68 is carried out, such that it projects from the spacer 64 also on a suitable distance so as to then allow handling of the end of the rod by the operator, as will be described hereinafter. This deployment of the piston rod 68 is also schematized in FIG. 4a.

Figure 4B:
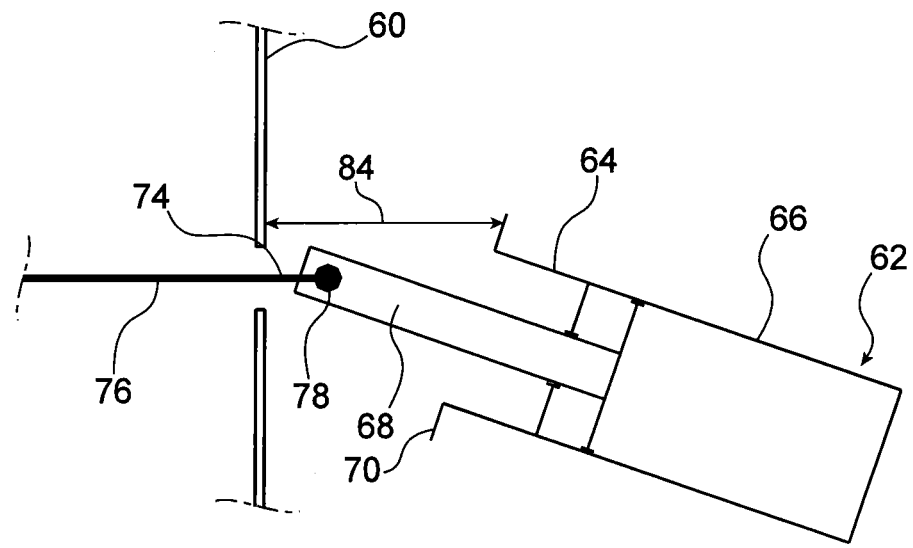

Then, the ram with its deployed rod is brought closer to the end 74, as shown in FIG. 4b. In this closer position of the ram 62 enabling its rod 68 to be connected to the end 74, the case wall 60 and the collar 70 of the spacer define between each other an access 84 enabling an operator's fingers to go through. Typically, this access has an axial length in the order of the value of the ram stroke, for example about 40 mm. This access 84 can be increased by tilting the axis of the ram 62 with respect to the axis of the connecting rod 76, as has been schematized in FIG. 4b. The access 84 is then defined by the most extended part of the opening between elements 60 and 70, herein the radially outer part, the most accessible to the operator from outside the turbojet engine.

The connection of the piston rod 68 to the end 74 of the transmission mechanism can then be performed via this access 84, using conventional means resulting in obtaining the mechanical junction 78, for example of the ball-jointed connection type.

Figure 4C:
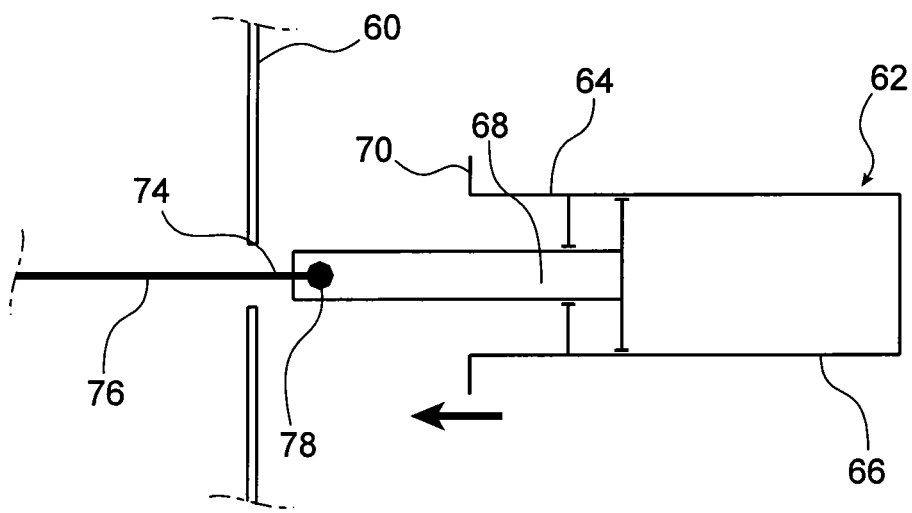
Figure 4D:
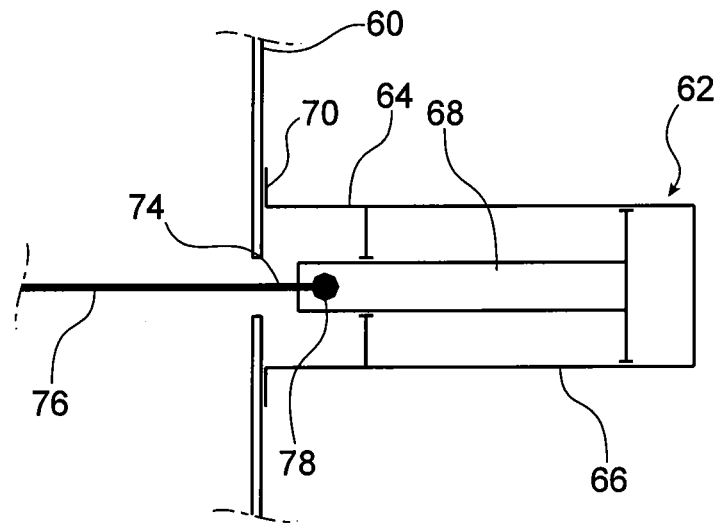

Once the mechanical junction is obtained, the partial or full retraction of the piston rod 68 is carried out so as to bring the cylinder 66 closer to the wall 60, as schematized in FIG. 4c. This retraction is preferably carried out by moving the cylinder 66 without moving the rod 68 relative to the wall 60, after the connecting rod 76 and the rod 68 have been realigned. It is manually implemented or using a suitable tooling, preferably a pump or the like. During this retraction of the piston rod 68, the latter as well as the connecting rod 76 thus remain substantially static with respect to the wall 60. The retraction is completed when the collar 70 comes to bear against the downstream surface of this wall 60, as is shown in FIG. 4d. At this stage, the mechanical junction 78 then lies inside the spacer 64, within which it can remain confined during the connecting rod stroke aiming at switching from the opening position of the VBV valves to their closing position, and reversely. Alternatively, during this stroke, the junction 78 can go through the opening of the wall 60, and thus go on the other side thereof.

The attachment of the collar 70 to the wall 60 can then be carried out, for example by assembling screws on inserts (not represented) equipping this wall, this screwing being performed from the downstream side where lies the ram. Finally, the ram 62 is thus embedded into the case wall 60, cantilevered.

The invention thus allows an easy assembly of the ram even with a restricted access to the operator, in particular limited to only the downstream side of the wall 60.

For the disassembly of the ram 62 carried out during maintenance phases, the abovementioned operations are implemented in the reverse order.

Figure 5:
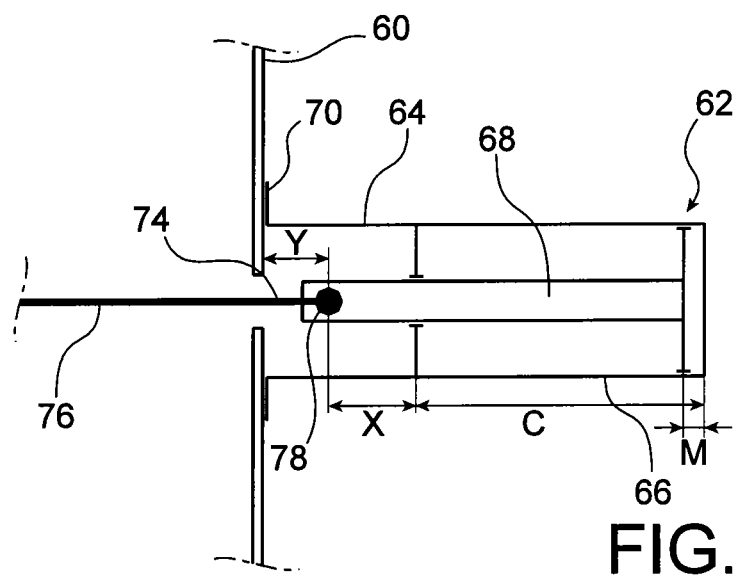
FIGS. 5 and 6 are schematic views illustrating dimensioning of the actuating ram.
Figure 6:
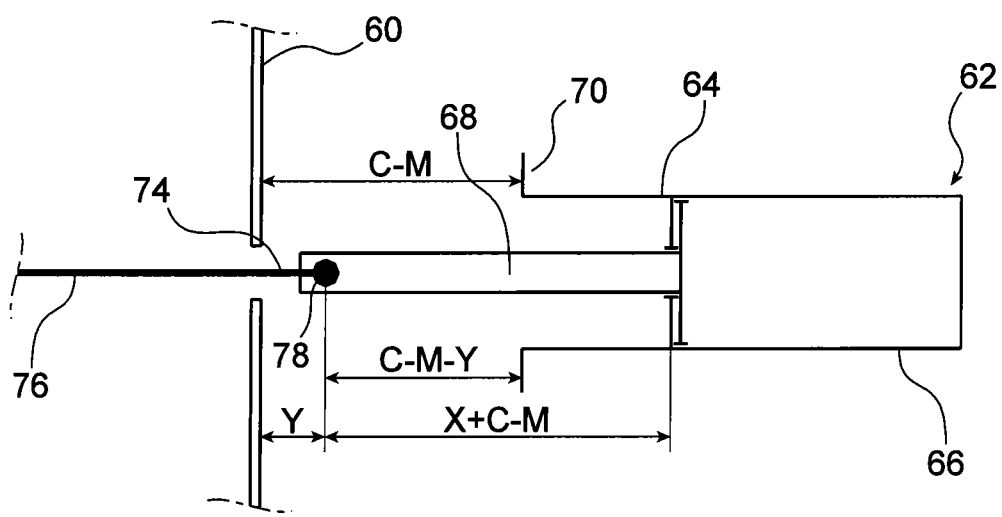

In reference now to FIGS. 5 and 6, an exemplary embodiment of the actuating ram 62 assembled to the case wall 60 is illustrated, with several preferred dimensioning criteria.

In FIG. 5, the configuration is that placing the VBV bleed valves 48 into the closing position. The piston rod 68 is thus retracted into the regulated stop position. Only a margin "M" is then observed between the piston 68 and the mechanical stop formed by the cylinder bottom. In this configuration, the distance "Y" is defined between the wall 60 and the centre of the mechanical junction 78, along the direction of the connecting rod 76 and the piston rod 68. The distance "X" is in turn defined between the centre of the mechanical junction 78 and the end of the cylinder 66, still along the same direction. Finally, the distance "C" corresponds to the theoretical maximum stroke of the piston, that is the distance separating both bottoms of the cylinder 66.

Thus, the length of the spacer 64 corresponds to the sum of the values X and Y. The length C−M, referenced in FIG. 6, here corresponds substantially to the access 84, without taking into account a possible tilting of the ram 62. This length therefore is preferentially sufficient to let an operator's fingers pass through. Finally, though not apparent in the figures, it is preferentially provided that the distance Y corresponds to about half the length C−M. The distance C−M is for example in the order of 40 mm, with M usually set to about 2 mm.

It is besides noted that when the spacer 62 is attached to the wall 60, as in FIG. 5, respecting distance Y leads not only to place each valve 48 into the closing position, but also leads to place the piston rod 68 into the retracted position, wherein the aforesaid margin M is observed.

Of course, various modifications could be made by those skilled in the art to the invention just described, only by way of non-limiting examples.

The invention claimed is:

1. A method for assembling an actuating ram of at least one air bleed valve placed between a low pressure compressor and a high pressure compressor of a turbomachine, the ram including a cylinder configured to be attached to a case wall from which projects an end of a connecting rod linked to the air bleed valve, the cylinder being extended by a spacer being used to attach the cylinder to the case wall, and including a piston rod surrounded by the spacer and configured to be connected to the end of the connecting rod, the method comprising:

deploying the piston rod to project from the spacer;

connecting the projecting piston rod to the end of the connecting rod projecting from the case wall on a side of the ram;

retracting the piston rod to bring the cylinder closer to the case wall; and attaching the spacer to the case wall, wherein the retracting the piston rod is implemented such that a mechanical junction between the piston rod and the end of the connecting rod lies, after the retracting, inside the spacer, wherein the spacer is made to have no side opening, and wherein the method further comprises a prior dimensioning of the ram, respecting the following condition:

$(C-M)/2 = Y$; with

C corresponding to a theoretical maximum stroke of the piston;

M corresponding to a mechanical stop margin in a retracted position of the rod; and Y corresponding to a distance between the wall and a center of the mechanical junction between the piston rod and the end, with the center of the mechanical junction arranged in the spacer attached to the wall, and bringing each valve into a closing position and bringing the piston rod into a retracted position.

2. The assembling method according to claim 1, wherein the attaching the spacer to the case wall is carried out by screwing.

3. The assembling method according to claim 1, wherein the deploying the piston rod is carried out such that in a ram position enabling the piston rod to be connected to the end of the connecting rod, the case wall and the spacer define between each other an access.

4. The assembling method according to claim 1, wherein the spacer is made as a single piece with the cylinder of the ram.

5. The assembling method according to claim 1, wherein the connecting the projecting piston rod to the end of the connecting rod is carried out using a ball-jointed connection or a hinged connection.

6. The assembling method according to claim 1, wherein the distance C−M is equal to 40 mm.

7. The assembling method according to claim 1, wherein the case wall is a downstream flange of an intermediate case of the turbomachine.

* * * * *